(12) United States Patent
Maul et al.

(10) Patent No.: US 7,819,092 B1
(45) Date of Patent: Oct. 26, 2010

(54) FUEL/FLUID HYBRID ENGINE

(76) Inventors: Joseph J. Maul, 984 Paisley Pl., Pickerington, OH (US) 43147; Scott Thomas Maul, 984 Paisley Pl., Pickerington, OH (US) 43147

( * ) Notice: Subject to any disclaimer, the term of this patent is extended or adjusted under 35 U.S.C. 154(b) by 879 days.

(21) Appl. No.: 11/680,059

(22) Filed: Feb. 28, 2007

Related U.S. Application Data

(60) Provisional application No. 60/743,955, filed on Mar. 30, 2006.

(51) Int. Cl.
*F02M 25/02* (2006.01)

(52) U.S. Cl. .................... 123/25 B; 12/577

(58) Field of Classification Search ...... 123/25 A–25 P, 123/25 J, 3, 525, 1 A, 575–578
See application file for complete search history.

(56) References Cited

U.S. PATENT DOCUMENTS

| | | | | |
|---|---|---|---|---|
| 3,973,524 | A * | 8/1976 | Rubin | 123/3 |
| 4,253,428 | A * | 3/1981 | Billings et al. | 123/1 A |
| 4,322,950 | A * | 4/1982 | Jepsen | 60/712 |
| 4,408,573 | A * | 10/1983 | Schlueter et al. | 123/25 P |
| 4,509,464 | A * | 4/1985 | Hansen | 123/1 A |
| 4,611,557 | A * | 9/1986 | Hierzenberger | 123/25 B |
| 4,750,453 | A * | 6/1988 | Valdespino | 123/3 |
| 5,396,866 | A * | 3/1995 | Kuntz | 123/25 B |
| 5,803,022 | A * | 9/1998 | Nelson et al. | 123/25 D |
| 6,347,605 | B1 * | 2/2002 | Wettergard | 123/25 B |
| 6,637,382 | B1 * | 10/2003 | Brehob et al. | 123/25 J |
| 6,951,210 | B2 * | 10/2005 | Landi et al. | 123/525 |
| 7,013,846 | B2 * | 3/2006 | Hagglund et al. | 123/25 B |

OTHER PUBLICATIONS

Csaba Csere, The Steering Column, Steam-the fire-and-pressure hybrid option, Apr. 2006, p. 9, www.carandriver.com.
Lyons, Pete, Crower patent Six-Stroke Engine, Feb. 27, 2006, p. 5, www.autoweek.com.
RSR Water Injection Calculator, RSR Turbo Water Injections, RB Racing, Mar. 30, 2006, 13 pages, htt://www.rbracing-rsr.com/waterinjection.html.

* cited by examiner

*Primary Examiner*—M. McMahon
(74) *Attorney, Agent, or Firm*—Standley Law Group LLP

(57) ABSTRACT

A system that may utilize heat normally wasted in known internal combustion engines to heat a fluid is described. The fluid may be maintained under pressure and when the fluid is injected into a cylinder in place of fuel during the combustion stroke, it may expand thus driving the piston back down.

20 Claims, 3 Drawing Sheets

FUEL/FLUID HYBRID ENGINE

This application claims the benefit of U.S. Provisional Application No. 60/743,955, filed Mar. 30, 2006, which is hereby incorporated by reference in its entirety.

BACKGROUND AND SUMMARY OF THE INVENTION

The present invention generally relates to an internal combustion engine and more particularly to a hybrid internal combustion engine where heat energy is reused to heat and compress a fluid, which is injected into the engine to increase the fuel efficiency thereof.

Internal combustion engines use a repeating cycle of intake, compression, combustion and exhaust to convert air and fuel into mechanical energy. The mechanical energy may be used to move a vehicle or may be converted to other forms of energy, such as, electricity. Only a small amount of energy is extracted from the combustion process and waste energy in the form of heat is radiated from the engine and out the exhaust. In order to dissipate the heat generated by the engine, a heat exchanger, generally known as a radiator, and/or other cooling systems may be employed. The radiator may contain a coolant, usually water mixed with anti-freeze (ethylene glycol). The coolant may be pumped through the engine compartment and may extract heat from the engine. Cooler outside air may pass over the heated coolant which may lower the temperature of the coolant by carrying the heat away as it passes over the radiator and away from the vehicle. The coolant may be pumped back through the engine compartment to extract heat in a continuous process. The heat radiated from the engine and/or extracted through use of a radiator or similar cooling system is wasted energy, which leads to greater fuel consumption.

Many efforts have been used to reduce the fuel consumption of the conventional automobile internal combustion engine. Alternative fuels have been considered. The "hybrid engine" may use a conventional internal combustion engine with at least one electric motor/generator. The electric motor/generator may operate the vehicle at low power settings and the internal combustion engine may operate the vehicle at high power settings. The "hybrid engine" may use regenerative braking by capturing kinetic energy normally lost during braking to charge the batteries, a process usually performed by an alternator, thus using less power and lowering fuel consumption.

The hybrid engine has increased fuel efficiency of modern internal combustion engines but greater efficiency is still desired. Exemplary embodiments of the present invention may utilize heat, normally wasted in known internal combustion engines, to heat a fluid. The fluid may be maintained at a high temperature and under pressure. Since the fluid may be maintained under pressure and at a high temperature, when the fluid is injected into a cylinder, it may immediately expand thus driving the piston back down. While the expanding fluid may give less power than a typical combustion stroke, controls may be put in place to allow fluid injection strokes to be used in place of combustion strokes when high power may not be required, such as when driving across a flat surface or as in the case of a generator, during low power demands such as during the night.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
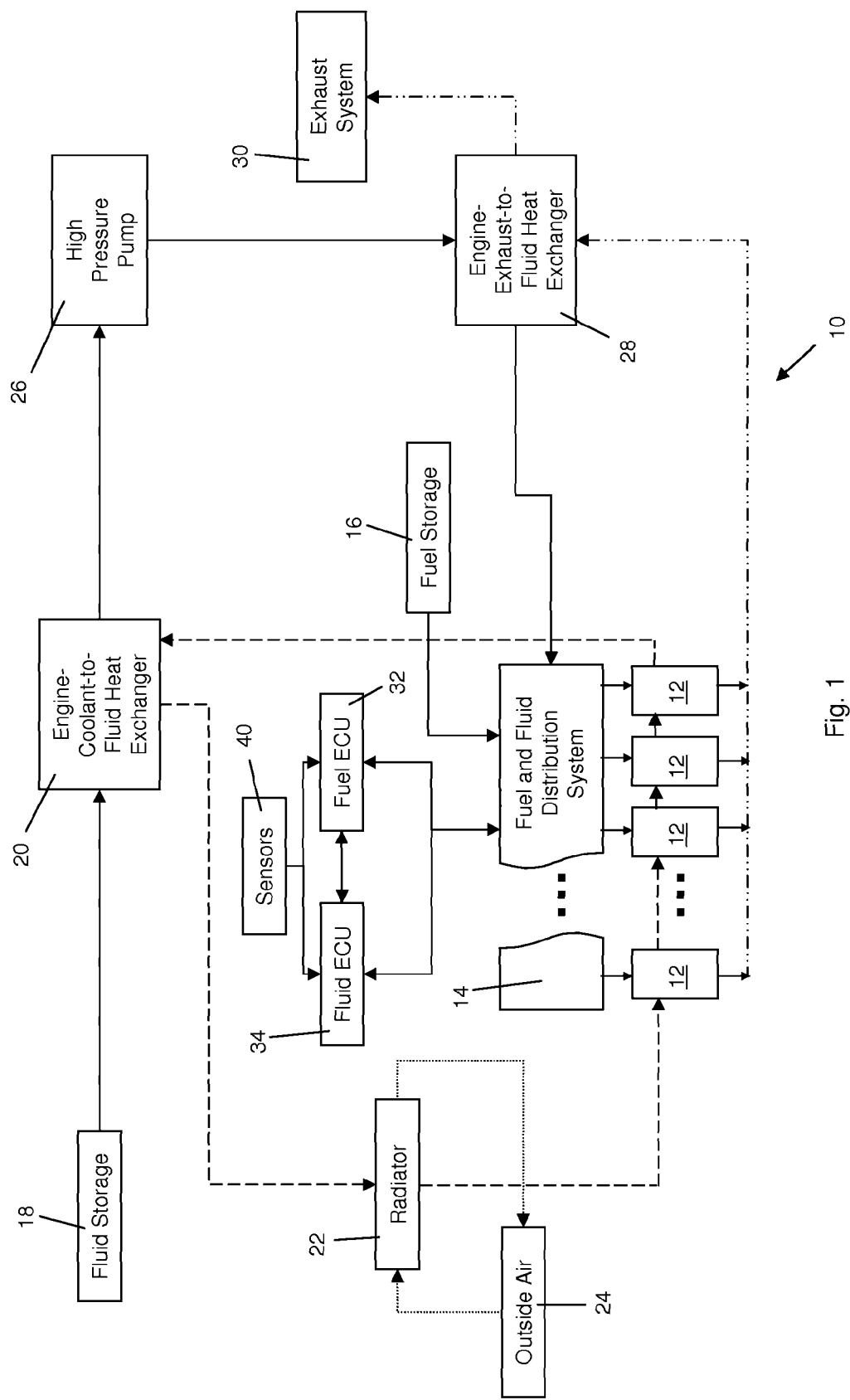
FIG. 1 is a schematic diagram of one exemplary embodiment of the present invention.

FIG. 1 illustrates a schematic diagram of one exemplary embodiment of the present invention. Exemplary embodiments may include an engine 10. The engine 10 may have a plurality of cylinders 12 which contain pistons 13 for converting energy produced through combustion into mechanical energy as will be known to one of ordinary skill in the art. Exemplary embodiments of the present invention are not limited to a certain number of cylinders and one of ordinary skill in the art will appreciate that the exemplary embodiments of the present invention may be used on engines with any number of cylinders. The cylinders 12 may receive fuel and fluid from a distribution system 14. The distribution system 14 may have a plurality of injectors for injecting fuel and fluid into the cylinders 12. The fuel and fluid may each have their own injector nozzles, 15 and 17 respectively. A plurality of injector nozzles may be used per cylinder 12. An integrated injector nozzle may also be used to supply both fuel and fluid. The nozzles may be located anywhere within the cylinder. The distribution system 14 may receive fuel from a fuel storage tank 16. The fuel may be any fuel used in an internal combustion engine, including but not limited to, gasoline, diesel and ethanol. The fluid may be stored in a fluid storage tank 18. The fluid may be a liquid, inert gas or other similar fluid. The fluid may be water and the water may be mixed with alcohol or other additives to help prevent the fluid from freezing, such as but not limited to, anti-freeze. In one embodiment, an inert gas, such as but not limited to, nitrogen and argon, may be used and stored in a pressurized storage tank. An electronic control unit (ECU) may control the timing, frequency and amount of fuel and fluid to inject into the cylinders 12. A single control unit may be used to control both fuel injection and the water injection. Multiple control units may be used, one for the fuel, for example fuel ECU 32, and one for the fluid, for example fluid ECU 34. The ECUs may sense and control any part of the engine, including but not limited to, radiator shutter, radiator electric fan, sensor array, coolant temperature, ambient temperature, exhaust temperature, water tank level, water pressure, engine RPM, fuel burn, fuel tank level, engine temperature, throttle setting and braking. Additional details of the distribution system 14 will be discussed below.

The fluid storage tank 18 may be connected to a first heat exchanger 20. In one embodiment, the first heat exchanger 20 may be a coolant-to-fluid heat exchanger. As shown in the dashed lines in FIG. 1, coolant may flow from a radiator 22 to the cylinders 12. The coolant may flow through a series of tubes around the cylinders 12 to draw heat away and thus cool the cylinders 12. Cooling the cylinders 12 may cause the coolant to rise in temperature between about 160 and about 200 degrees. The warmer coolant may flow through one part of the first heat exchanger 20 and the cooler fluid may flow through another part. This may cause the fluid to rise in temperature and the coolant to lower in temperature. The coolant may flow to a radiator 22 which may cool the coolant to a lower temperature by flowing cooler outside air 24 over the coolant. The life of the radiator 22 may be extended since the first heat exchanger 20 may reduce the temperature of the coolant before the coolant returns to the radiator 22. The coolant may then be passed back into the cylinders 12 in a continuous process. The fluid temperature may rise from about ambient temperature to about 160-200 degrees Fahrenheit. The first heat exchanger 20 may raise the temperature of the fluid to as high a temperature as possible without reaching the fluid's boiling point and thus changing the fluid to a gas.

The engine 10 may include a high pressure pump 26. The high pressure pump 26 may be any pump known in the art, such as but not limited to, electric, belt drive, electromagnetic and/or clutched. In one exemplary embodiment, the high pressure pump 26 may be an electric pump which runs off of a typical engine battery. The high pressure pump 26, may receive fluid from the first heat exchanger 20 and may raise the pressure of the fluid to about 1200 pounds-force per square inch (psi) or greater. The high pressure pump 26 may also raise the temperature of the fluid to about 200 degrees Fahrenheit or greater. The engine 10 may also have a second heat exchanger 28. The second heat exchanger 28 may be an exhaust-to-fluid heat exchanger. The second heat exchanger may also be disposed inside a turbocharger. As shown in dashed-dotted lines in FIG. 1, one part of the second heat exchanger 28 may receive heated exhaust gasses from the cylinders 12 and another part may receive the fluid from the high pressure pump 26. The heated exhaust gasses, which may be about 1,100 degrees Fahrenheit, may raise the temperature of the fluid to about 300 degrees Fahrenheit or greater and may maintain the pressure of the fluid at about 1000 psi or greater. After heating the fluid, the exhaust gasses may continue to the exhaust system 30 of the engine 10 and may be expelled to the ambient environment. Exhausted steam helps to reduce exhaust gas temperatures (EGT) absorbing more heat as it passes through exhaust valve, head, turbo turbine and exhaust system. Moisture content of exhausted gas may also combine with soot for easier emission control.

Figure 2:
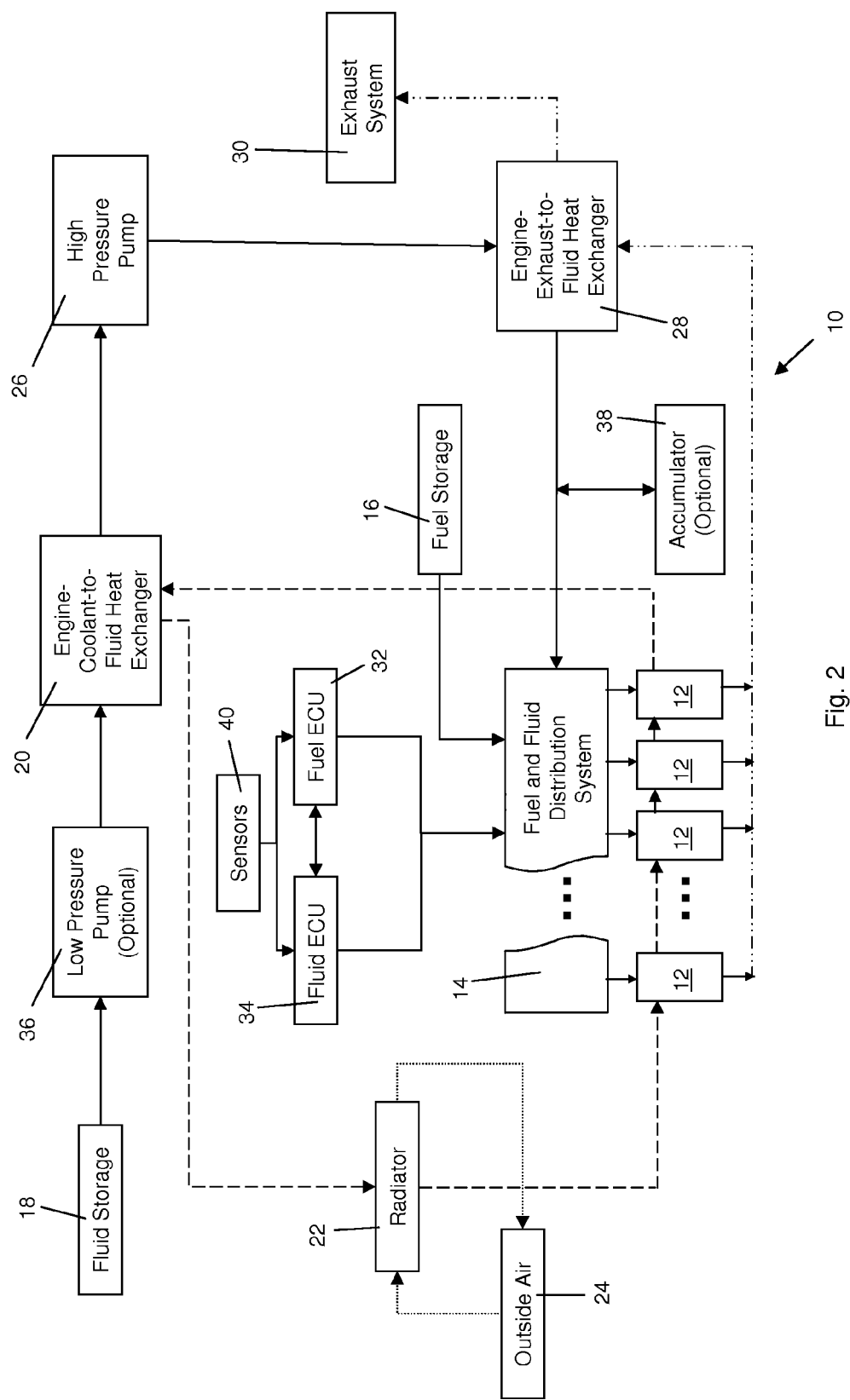
FIG. 2 is a schematic diagram of another exemplary embodiment of the present invention.
Figure 3:
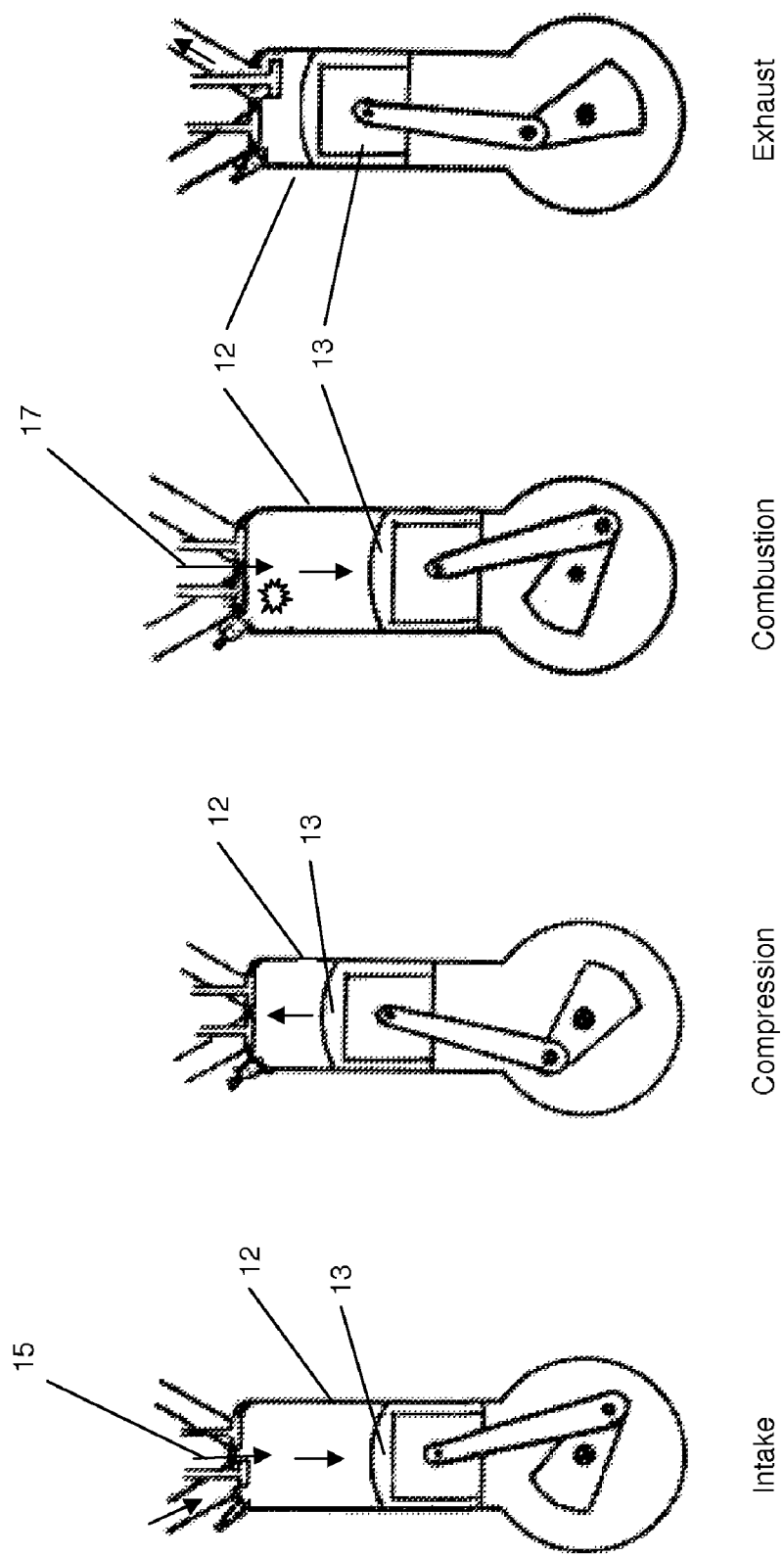
FIG. 3 illustrates an engine cycle of one exemplary embodiment of the present invention.

In another exemplary embodiment, as shown in FIG. 2, an optional low pressure pump 36 may be disposed between the fluid storage tank 18 and the first heat exchanger 20. The low pressure pump 36 may also be any pump known in the art. The low pressure pump 36 may assist the high pressure pump 26 in bringing the fluid up to a certain pressure. This may alleviate some strain on the high pressure pump 26. Additionally, an optional accumulator 38 may be disposed downstream of the high pressure pump 26. The accumulator 38 may be a spring-type accumulator and may be an additional storage device for the fluid while maintaining the pressure the fluid may have gained. In any of the exemplary embodiments, the location of the high pressure pump 26 and second heat exchanger 28 may vary. For example, in FIG. 1, the high pressure pump 26 and second heat exchanger 28 may swap positions. In this example, the fluid would travel from the first heat exchanger 20 to the second heat exchanger 28 and then to the high pressure pump 26. The optional accumulator 38 may also be located anywhere in the system downstream of the high pressure pump 26 and upstream of the distribution system 14. An optional flow restrictor and return line may be used with either or both pumps to ensure that the fluid line is full.

While the engine is in use, the fuel ECU 32 and fluid ECU 34 may monitor sensors 40 in various parts of the engine. Based on the outputs from those sensors 40 and the operational status of the engine, the ECUs may determine when the distribution system 14 should inject fluid and fuel into the cylinders 12 with nozzles 17 and 15 respectively. When fluid ECU 34 determines fluid should be injected into the cylinder 12, fuel may be withheld from being injected from nozzle 15 in the intake step and fluid may be injected through nozzle 17 into cylinder 12 during the combustion step. The pressure drop from the nozzle 17 to the cylinder 12 and the temperature of the fluid may cause the fluid to expand. If a liquid is used, the liquid may also change to a gas, such as water turning to steam. The expansion may have an effect similar to combustion and may drive the piston 13 down providing propulsion for the vehicle. The introduction of the fluid into the cylinders may be aided by the fact that the environment and surfaces that the fluid is injected into are preheated by previous fuel cycles and have greater thermal mass than the injected fluid allowing for the flash power stroke to take place rather than having the cylinder surfaces simply absorb and condense the recovered heat from the preheated fluid injection. In simpler terms, the piston, cylinder wall, valves and cylinder head may have higher temperatures and more BTU's to give up. Rather than absorbing BTU's, they release BTU's to the fluid power stroke. The ECUs, 32 and 34, may adjust when injection occurs real-time based on inputs from sensors 40. Under normal operation, the ECUs may withhold fuel every other cycle, injecting fluid instead. During high power demands, no fluid may be injected. Alternatively, during low power demands, fluid may be injected more often, thus increasing fuel efficiency. Injection may occur independently or simultaneously. Simultaneous injection, where fluid and fuel are injected in the same cycle may have an advantage, especially in diesel engines, for cooling the cylinders and reducing nitrogen oxide or NOx.

Exemplary embodiments of the present invention may be used on any internal combustion engine. In particular, exemplary embodiments may be integrated into a typical 4-stroke engine. Exemplary embodiments may be integrated into newly manufactured engines or may be retrofit into existing engines. Exemplary embodiments may be used in any vehicle, such as, but not limited to, cars, trucks, motorcycles, boats and tractor trailers.

While certain embodiments of the present invention are described in detail above, the scope of the invention is not to be considered limited by such disclosure, and modifications are possible without departing from the spirit of the invention as evidenced by the following claims:

What is claimed is:

1. An engine comprising:
   first and second heat exchangers configured to receive a fluid and to raise the temperature thereof;
   a first pump in communication with said first or said second heat exchanger, said first pump configured to receive and compress said fluid;
   a fuel and fluid distribution system in communication with said second heat exchanger or said first pump, said fuel and fluid distribution system adapted to receive said fluid and a fuel; and
   a cylinder in communication with said fuel and fluid distribution system and adapted to receive said fluid and said fuel
   wherein a fuel injector injects fuel into said cylinder and a fluid injector injects fluid into said cylinder;
   wherein the fuel and fluid distribution system withholds the amount of fuel supplied during low power demands of said engine and said system supplies fluid in place of said fuel.

2. The engine of claim 1 further comprising:
an ECU in electronic communication with said fuel and fluid distribution system, said ECU adapted to control when said fuel and said fluid are injected into said cylinder.

3. The engine of claim 2 further comprising:
a plurality of sensors in electronic communication with said ECU, said sensors monitoring the operating conditions of said engine.

4. The engine of claim 3 wherein said ECU includes a fuel ECU and a fluid ECU.

5. The engine of claim 1 further comprising:
a fluid storage device in communication with said first heat exchanger.

6. The engine of claim 5 further comprising:
a second pump in communication with said fluid storage device and said first heat exchanger, said second pump configured to receive and compress a fluid.

7. The engine of claim 6 further comprising:
an accumulator in communication with said second heat exchanger or said first pump.

8. The engine of claim 7 further comprising:
a radiator in communication with said first heat exchanger; and
an exhaust system in communication with said second heat exchanger.

9. The engine of claim 1, wherein the fuel and fluid distribution system alternatively supplies fuel on one cycle and fluid on the following cycle.

10. The engine of claim 1, wherein the fuel and fluid distribution system supplies more fluid and reduces the amount of fuel supplied into said cylinder as the amount of power demand decreases.

11. An engine comprising:
a plurality of cylinders, each cylinder having at least one piston;
a radiator in communication with said cylinders, said radiator adapted to provide a coolant to said cylinders;
an coolant-to-fluid heat exchanger in communication with said radiator, said coolant-to-fluid heat exchanger adapted to lower the temperature of said coolant;
a fluid storage device in communication with said coolant-to-fluid heat exchanger, said fluid storage device adapted to provide fluid to said coolant-to-fluid heat exchanger, said coolant-to-fluid heat exchanger adapted to raise the temperature of said fluid;
a first pump in communication with said coolant-to-fluid heat exchanger, said first pump adapted to raise the pressure of said fluid; and
a fuel and fluid distribution system in communication with said first pump, said fuel and fluid distribution system adapted to receive said fluid and a fuel, said fuel and fluid distribution system adapted to inject said fluid into said plurality of cylinders;
wherein a fuel injector injects fuel into said cylinder and a fluid injector injects fluid into said cylinder;
wherein the fuel and fluid distribution system withholds the amount of fuel supplied during low power demands of said engine and said system supplies fluid in place of said fuel.

12. The engine of claim 11 further comprising:
an exhaust-to-fluid heat exchanger in communication with said first pump, said exhaust-to-fluid heat exchanger adapted to raise the temperature of said fluid and the provide said fluid to said fuel and fluid distribution system.

13. The engine of claim 12 further comprising:
an exhaust system in communication with said cylinders and said exhaust-to-fluid heat exchanger.

14. The engine of claim 13 further comprising:
a second pump in communication with said fluid storage device, said second pump adapted to raise the pressure of said fluid and to provide said fluid to said coolant-to-fluid heat exchanger.

15. The engine of claim 14 further comprising:
an ECU in electronic communication with said fuel and fluid distribution system, said ECU adapted to control when said fuel and said fluid are injected into said plurality of cylinders.

16. The engine of claim 15 further comprising:
a plurality of sensors in electronic communication with said ECU, said sensors monitoring the operating conditions of said engine.

17. The engine of claim 16 wherein said ECU includes a fuel ECU and a fluid ECU.

18. The engine of claim 17 further comprising:
an accumulator in communication with said exhaust-to-fluid heat exchanger.

19. The engine of claim 11 wherein said fuel and fluid distribution system includes a plurality of fluid injectors and a plurality of fuel injectors.

20. The engine of claim 11 wherein said fuel and fluid distribution system includes a plurality of injectors adapted to inject said fuel and said fluid into said plurality of cylinders.

* * * * *